(12) United States Patent
Warren

(10) Patent No.: US 8,321,998 B2
(45) Date of Patent: Dec. 4, 2012

(54) ROPE LOCKING DEVICE

(75) Inventor: Richard L. Warren, Tampa, FL (US)

(73) Assignee: Roto Kinetics LLC, Clarkesville, GA (US)

( * ) Notice: Subject to any disclaimer, the term of this patent is extended or adjusted under 35 U.S.C. 154(b) by 616 days.

(21) Appl. No.: 12/558,629

(22) Filed: Sep. 14, 2009

(65) Prior Publication Data

US 2011/0061208 A1    Mar. 17, 2011

(51) Int. Cl.
*F16G 11/10* (2006.01)
*F16G 11/00* (2006.01)
*B65H 77/00* (2006.01)

(52) U.S. Cl. .......... 24/134 KA; 24/134 R; 403/301; 403/374.5

(58) Field of Classification Search .......... 24/134 R, 24/134 KA, 134 KB, 134 L, 134 N, 134 P, 24/71.1; 403/301, 374.1, 374.5
See application file for complete search history.

(56) References Cited

U.S. PATENT DOCUMENTS

| | | | |
|---|---|---|---|
| 798,563 A * | 8/1905 | Briggs | 24/134 R |
| 950,702 A | 3/1910 | O Brien | |
| 1,459,265 A * | 6/1923 | Saundry | 403/301 |
| 1,573,650 A * | 2/1926 | Signer | 24/134 R |
| 1,830,470 A * | 11/1931 | Kohl | 24/134 L |
| 3,524,229 A | 8/1970 | Mindt | |
| 4,592,116 A | 6/1986 | Christensen | |
| 4,878,270 A | 11/1989 | Westerkamp | |
| 5,548,873 A | 8/1996 | Macias | |
| 5,671,509 A | 9/1997 | Yeung | |
| 7,039,987 B2 * | 5/2006 | van Gijsel et al. | 24/134 R |

* cited by examiner

*Primary Examiner* — Robert J Sandy
(74) *Attorney, Agent, or Firm* — Defillo & Associates, Inc; Evelyn A. Defillo

(57) ABSTRACT

A tensioning device that is inexpensive to manufacture and is useful for various rope tensioning applications. The rope locking device can be used anywhere along a length of rope that is being used to hold, tie down, or secure a load or item. The rope locking device includes: a body having a first end, a second end, and side ends; a first bore extending through the body; a second bore extending through the body, wherein the second bore is horizontally aligned and spaced apart from said first bore by a first space, wherein the first and second bore are located proximate to the first end of the body; a third bore extending through the body, wherein the third bore is located proximate to the second end of the body, and wherein the third bore is spaced from the first and second bores; a first slot vertically aligned with the first bore; a second slot vertically aligned with the second bore, wherein the second slot is spaced from the first slot by a second space; and a cam element pivotally mounted within the third bore.

12 Claims, 9 Drawing Sheets

ROPE LOCKING DEVICE

FIELD OF THE INVENTION

The present invention relates to a locking device for a flexible line to facilitate the fastening and tensioning of the line at any desired location. More specifically, the present invention relates to a rope locking device that attaches to a rope anywhere along a length of the rope to quickly tighten and secure the rope.

BACKGROUND OF THE INVENTION

When securing a load to a cargo bed with a line, the line must be tensioned to prevent shifting or movement of the load. If a line loosens during the transport of the load, the cargo may shift or fall from the vehicle and get damaged, injure other vehicles, persons, or property.

The common procedure for fastening the line includes passing the free end of the line through one of the anchor hooks located about the peripheries of the vehicle and then pulling the line firm against the hook until the line can be tied off. This task requires the use of dexterity and strength of the user. In addition, if various lines are required across the load, this will increase considerably the time required to reach the desired conditions.

The prior art shows a wide range of devices for clamping ropes, cable, lines, and the like (hereinafter referred to as "ropes") to facilitate the fastening and tensioning of the ropes between two points or across a load. Unfortunately, the majority of the known devices are only designed to allow the fastening of the rope and they cannot be used to tension the rope.

In addition, the prior art shows complicated and relatively expensive devices specially designed for tensioning a rope and firmly holding the load in position. For example, pulleys or winches, which require a fixed base, are used to tension the rope so that the load is firmly held in position. Unfortunately, in these types of devices it is difficult to adjust the length of the tie-down to size prior to tensioning. In addition, the majority of these devices are complicated and expensive to manufacture. Most have either been difficult to release for removal of the cargo or unstable and unreliable under tension during transport. Furthermore, it is difficult to use such devices in differing locations along the length of the rope where tensioning of the rope is specifically needed.

Other devices known in the art designed to tension the rope work with a loop of the rope, one end of which is secured to the device and the other end of which passes through the device. Various arrangements on the design permit enlargement or diminishing of the loop to effect an overall adjustment in the length of the rope between the loop and the opposite end. When the desired length is obtained, the device is secured to the rope to prevent either enlargement or decreasing of the loop to produce an overall adjustment in the length of the rope between the loop and the opposite end. Unfortunately, these devices need to be tied-down to an anchoring hook and cannot be moved from one position to another position along the length of the rope where tensioning of the rope is specifically needed.

In addition, the prior art has developed mechanical rope cinching devices which are particularly appropriate to be used with wire, rope and chain. Such mechanical rope cinching apparatus are complicated in design and have many moving parts. The design complexity results in reliability and operating difficulty.

The present inventor thought of the necessity for a rope locking device that can be moved from one position to another position along the length of the rope without having to be close to any anchoring means.

Furthermore, the present inventor thought of the need for a relatively simple and easy to use rope locking device that does not possess the disadvantages of the prior art known devices. That is, there is a need to provide a rope locking device that is self-locking, quickly releases the rope from the engaging cam, is simple with a minimum number of moving parts, and wherein accidental release of the rope from the cleat device is prevented.

SUMMARY OF THE INVENTION

It is an objective of the present invention to provide a rope locking device which can lock and tension the rope simultaneously.

It is another objective of the present invention to provide a rope locking device that can be moved from one position to another position along the length of the rope without having to be close to any anchoring means.

It is another objective of the present invention to provide a rope locking device which is simple and inexpensive to manufacture while providing a high degree of reliability and efficiency in use.

It is another objective of the present invention to provide a rope locking device which enables the tie-down to be quickly and easily applied and tensioned and just as quickly and easily removed.

It is another objective of the present invention to provide an improved rope locking device capable of quickly and easily adjusting the size of a loop of rope formed by it.

The present invention is a tensioning device that is inexpensive to manufacture and is useful for various rope tensioning applications. The device of the invention is a versatile rope locking device that can be used anywhere along a length of rope that is being used to hold, tie down, or secure a load or item.

The present invention relates to a rope locking device comprising:

a body having a first end, a second end, and side ends;
a first bore extending through the body;
a second bore extending through the body, wherein the second bore is horizontally aligned and spaced apart from said first bore by a first space, wherein the first and second bore are located proximate to the first end of the body;
a third bore extending through the body, wherein the third bore is located proximate to the second end of the body, and wherein the third bore is spaced from said first and second bores;
a first slot vertically aligned with the first bore;
a second slot vertically aligned with the second bore, wherein the second slot is spaced from the first slot by a second space; and
a cam element pivotally mounted within the third bore.

The first and second bores are parallel to each other and the third bore is not connected with the first bore or the second bore. The first and second slots have a U-shape and the second space has an L-shape.

In one embodiment, the first bore and second bore are tapered.

In addition, the present invention further comprises a channel running from one of the side walls of the body, through the third bore, and through the other side wall, wherein the channel is vertically aligned with the third bore and the cam element.

In addition, the present invention relates to a method for tensioning a rope between two points, the method comprising the steps of:

a) providing a rope locking device comprising:
a body having a first end, a second end, and side ends;
a first bore extending through the body;
a second bore extending through the body, wherein the second bore is horizontally aligned and spaced apart from said first bore by a first space, wherein the first and second bore are located proximate to the first end of the body;
a third bore extending through the body, wherein the third bore is located proximate to the second end of the body, and wherein the third bore is spaced from said first and second bores;
a first slot vertically aligned with the first bore;
a second slot vertically aligned with the second bore, wherein the second slot is spaced from the first slot by a second space;
a cam element pivotally mounted within the third bore;
b) passing a length of the rope through the first bore; looping back the length of rope leaving the first bore through the first slot and over the second space;
passing the end of the rope through the second slot and looping back through the second bore;
choosing a desired length of rope to stay behind; routing the remaining length of rope through an empty space between the cam element and a side wall of the third bore;
moving the cam element to a closed position to grasp the rope.

In another embodiment, the present invention further comprises an open area in connection with the third bore hole.

The device of the present invention facilitates stretching a line firmly between two points to securely hold an object tied in place by maintaining tension on the rope used to secure the object. The device according to this invention may be used to secure a load on a truck or trailer; secure tents, tarpaulins, canvas awnings; secure clothes lines; adjust a boat anchor length; secure a line to a tree; and set up sports nets, such as volleyball and badminton nets since the tightness of the ropes may be quickly adjusted. However, it should be appreciated by those of average skill in the art that the invention has broader applications and may also be adapted for use in many other environments where it is desired to tighten cable, rope, webbing or the like.

The combination and peculiar arrangement of the parts of the present invention allows the simultaneous locking and tensioning of a rope by placing the device at any position along the length of the rope without having to be close to an anchoring point.

BRIEF DESCRIPTION OF THE DRAWINGS

For a fuller understanding of the nature and objectives of the invention, reference should be made to the following detailed description taken in connection with the accompanying drawings in which.

DETAILED DESCRIPTION OF THE INVENTION

For purposes of this application, the term rope will be used to refer to any type of rope, string, cord, twine or any other flexible elongate members. The device may be used in any application where a rope needs to be tightened between two points.

The device according to the present invention provides the ability to maintain tension on a rope in addition to the ability to freely locate the device at any point along the length of the rope where tension is needed by the unique arrangement of holes and slots that firmly secures the device to the rope. This unique arrangement provides the freedom of placing the device at any desired position through the length of the rope.

Figure 1:
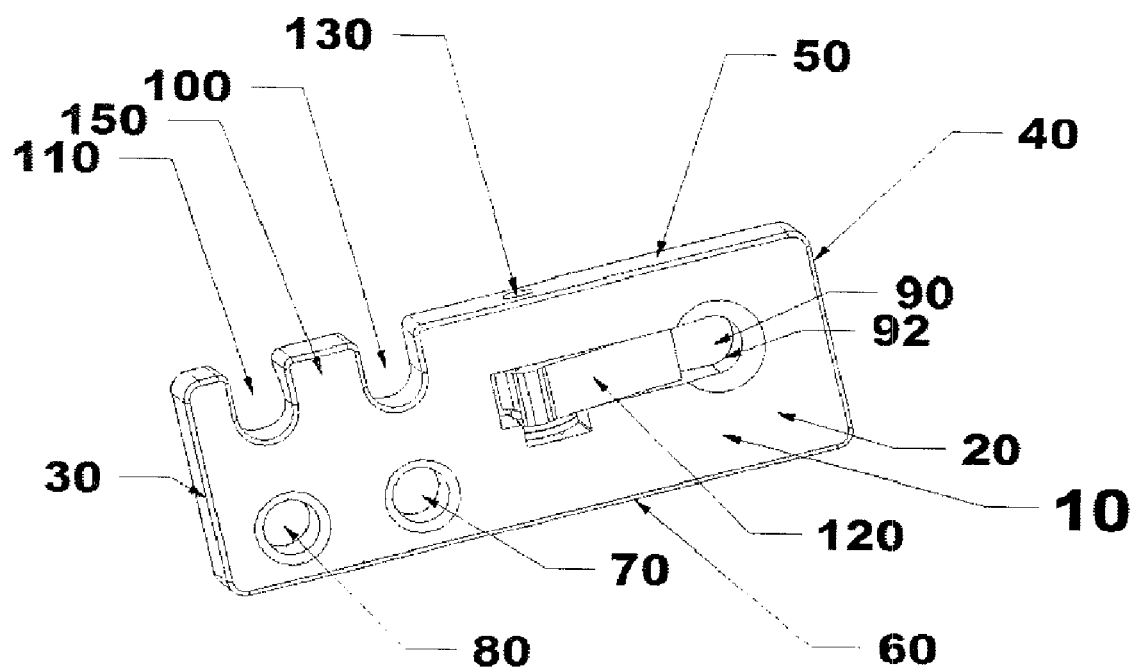
FIG. 1 is a perspective rear view of the device showing the cam in the open position.

FIG. 1 of the present invention shows the device 10, which comprises: a body 20 having a first end 30, a second end 40, and side ends 50, 60;

a first bore 70 extending through the body 20;
a second bore 80 extending through the body 20, wherein the second bore 80 is horizontally aligned and spaced apart from said first bore 70, wherein the first bore 70 and second bore 80 are located proximate to the first end 30 of the body 20;
a third bore 90 extending through the body 20, wherein the third bore 90 is located proximate to the second end 40 of the body 20, and wherein the third bore 90 is spaced from the first bore 70 and second bore 80;
a first slot 100 vertically aligned with the first bore 70;
a second slot 110 vertically aligned with the second bore 80, wherein the second slot 110 is spaced from the first slot 100; and
a cam element 120 pivotally mounted within the third bore 90.

The body 20 may be made of a single piece having any desirable shape, preferably a rectangular shape, with a thickness sufficient to make the body rigid. The body 20 may be made of molded plastic, or a metal casting of aluminum or other tough, durable material such as a ceramic, hard resin, or a polymeric plastic material. Whenever heavier duty or heavier strengths are required, metal is clearly the material of choice, although certain types of plastic material have been found to be quite durable and acceptable for certain structures for at least moderate duty.

The first bore 70 and second bore 80 are parallel to each other. The first bore 70 and second bore 80 may be straight bores (as illustrated).

In one embodiment of the present invention the first bore 70 and second bore 80 are preferably tapered to facilitate the use of many sizes of rope that can be secured within the device of the invention. The ability to grip different sizes of rope allows the device to be suitable for diverse applications.

The third bore 90 extends through the body 20 and is located proximate to the second end 40 of the body 20. The third bore 90 is spaced from the first bore 70 and second bore 80 and is not connected with either of the first bore 70 and the second bore 80. The third bore 90 may have any desirable shape as long as it allows the accommodation of the clamp element 120 and the passing of the rope.

In another embodiment of the present invention the third bore 90 is not horizontally aligned with the first bore 70 or the second bore 80. Furthermore, the third bore 90 is horizontally aligned with the space 112 between the slots 110, 100 and the bores 80, 90.

In another embodiment of the present invention the third bore 90 has an oval shape.

The present invention further comprises a channel 130 running from one of the side walls 50 of the body 20, through the third bore 90, and through the other side wall 60. The channel 130 is vertically aligned with the third bore 90 and the cam element 120.

Furthermore, a dowel 140 passes through the channel 130 and pivotally supports the cam element 120 inside the third bore 90.

In another embodiment of the present invention the first and second slots 100, 110 may have a U-shape and the space 150 between the first slot 100 and the second slot 110 has an L-shape. The L-shape of the space 150 between the first slot 100 and the second slot 110 forms a hook that allows the device to firmly secure the rope passing through the slots 100 and 110.

In another embodiment of the present invention the L-shaped space 150 includes a plurality of teeth disposed in its internal size in order to further help grasp the rope.

Figure 2:
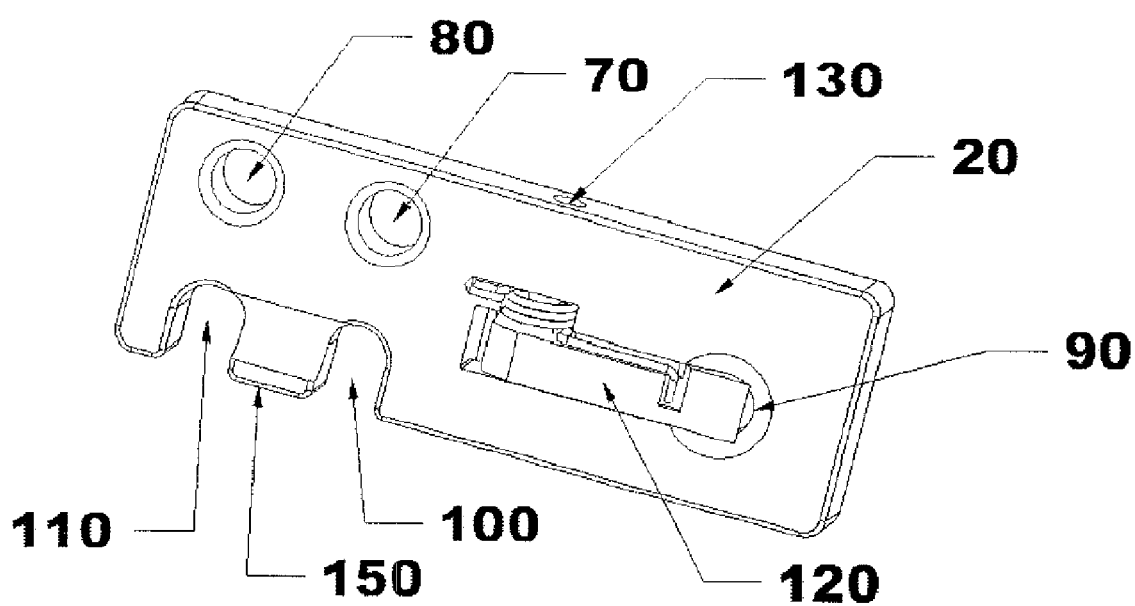
FIG. 2 is a perspective front view of the device showing the cam in the close position.
Figure 3:
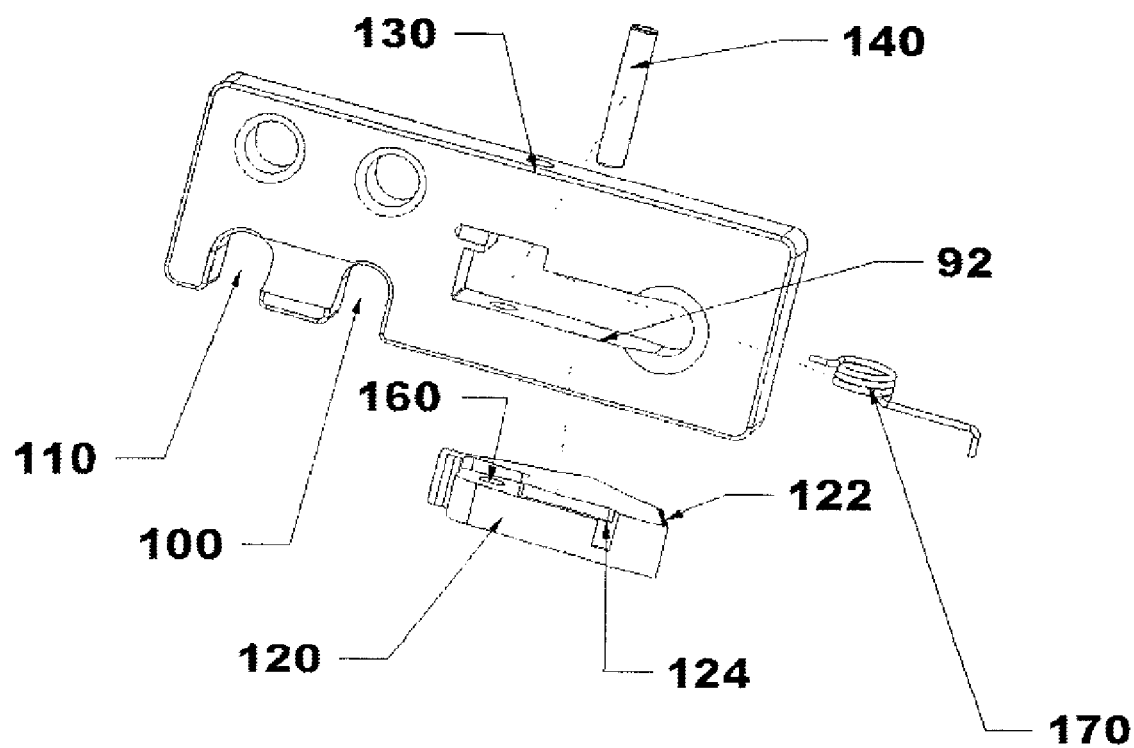
FIG. 3 is an exploited front view of the components of the device according to the present invention.
Figure 4:
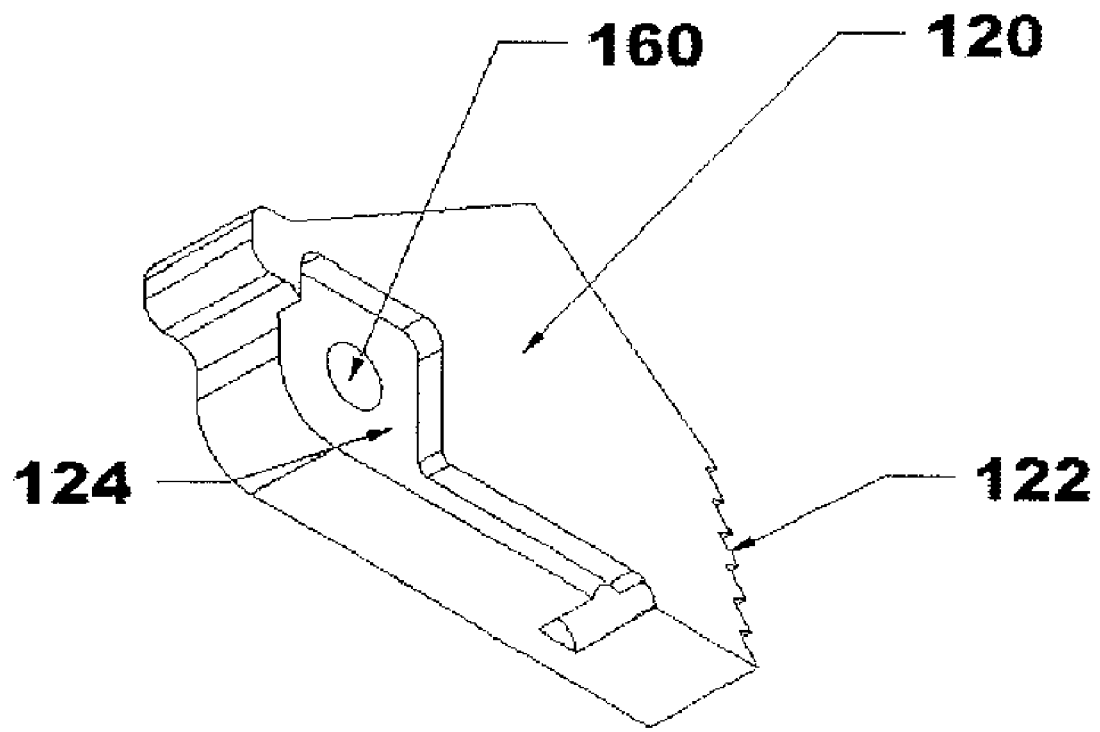
FIG. 4 is a top perspective view of the cam according to the device of the present invention.
Figure 5:
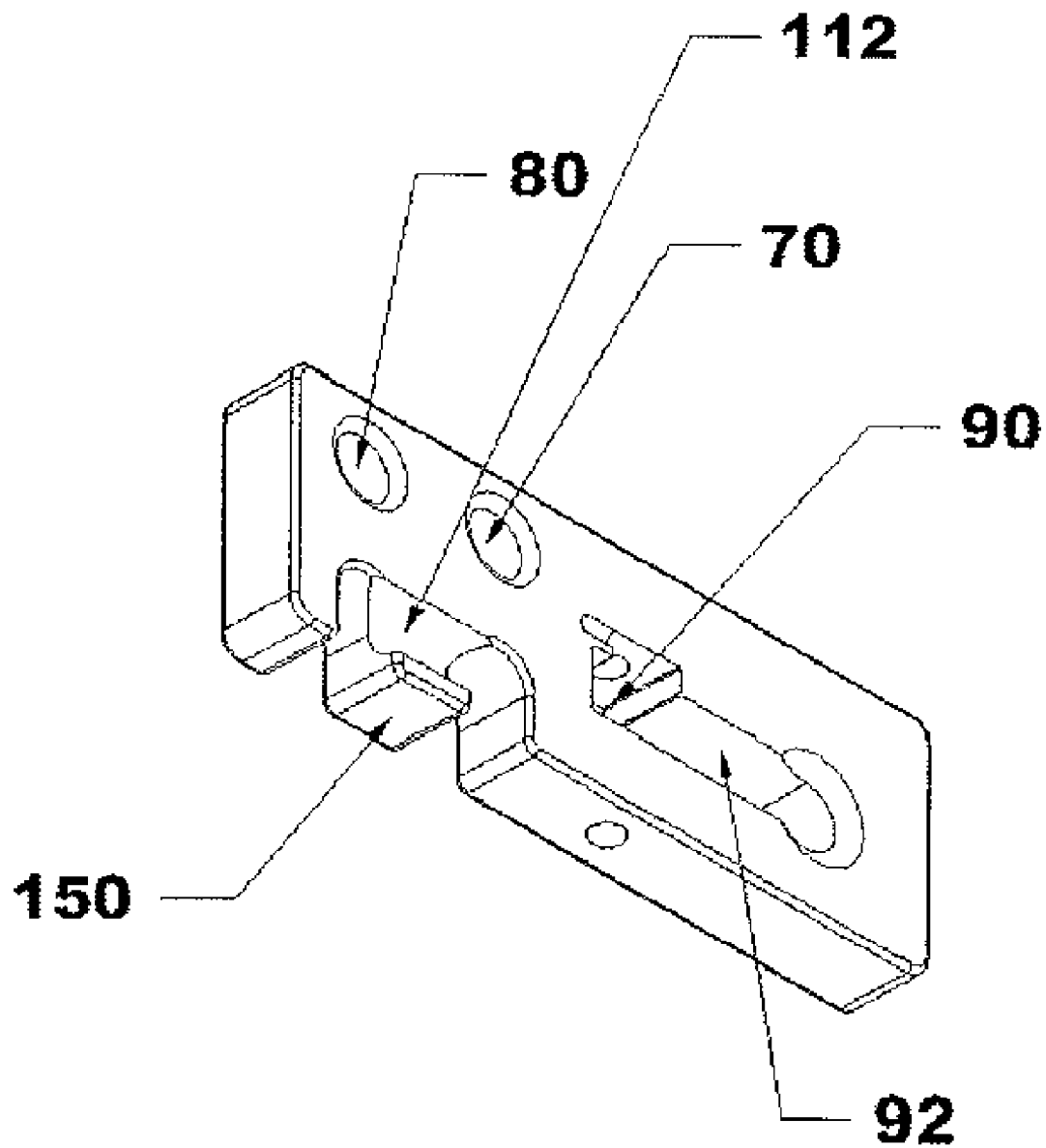
FIG. 5 is a front view of the device according to the present invention.

Cam element 120 is the only moving part of the device according to the present invention. The cam element 120 is pivotally mounted in the third bore 90 as illustrated on FIGS. 1-2. For that purpose, an orifice 160 extends through one end of the cam element 120 to receive the dowel 140 for eccentrically mounting cam element 120 for pivoting. A recess 124 runs through the cam element 120 which receives a spring 170, as seen in FIG. 2 and FIG. 3.

The cam element 120 may have one of its sides having a convexly curved shape and including teeth 122 in its periphery arranged at an angle to facilitate the grasping of the rope between the cam element 120 and one of the side walls 92 of the third bore 90. The teeth 122 of the cam element 120 and the side wall 92 of the third bore 90 are spaced apart a sufficient distance to allow pivoting of the cam element 120 into the third bore 90 and the grasping of the rope in its locked position. The utilization of teeth arranged at an angle permits to freely slide the rope in the non-locking position and securing the rope in the locked position.

The present invention is not limited by the type of cam element just described. Any type of cam element may be used.

In another embodiment of the present invention the clamping element 120 pivots about the dowel 140 and is biased downwardly by a spring 170 to project into the third bore 90. The biasing force of the spring 170 may be manually overcome to pivot the cam element 120 in order to allow insertion of any portion along the length of a rope into the device.

Figure 6:
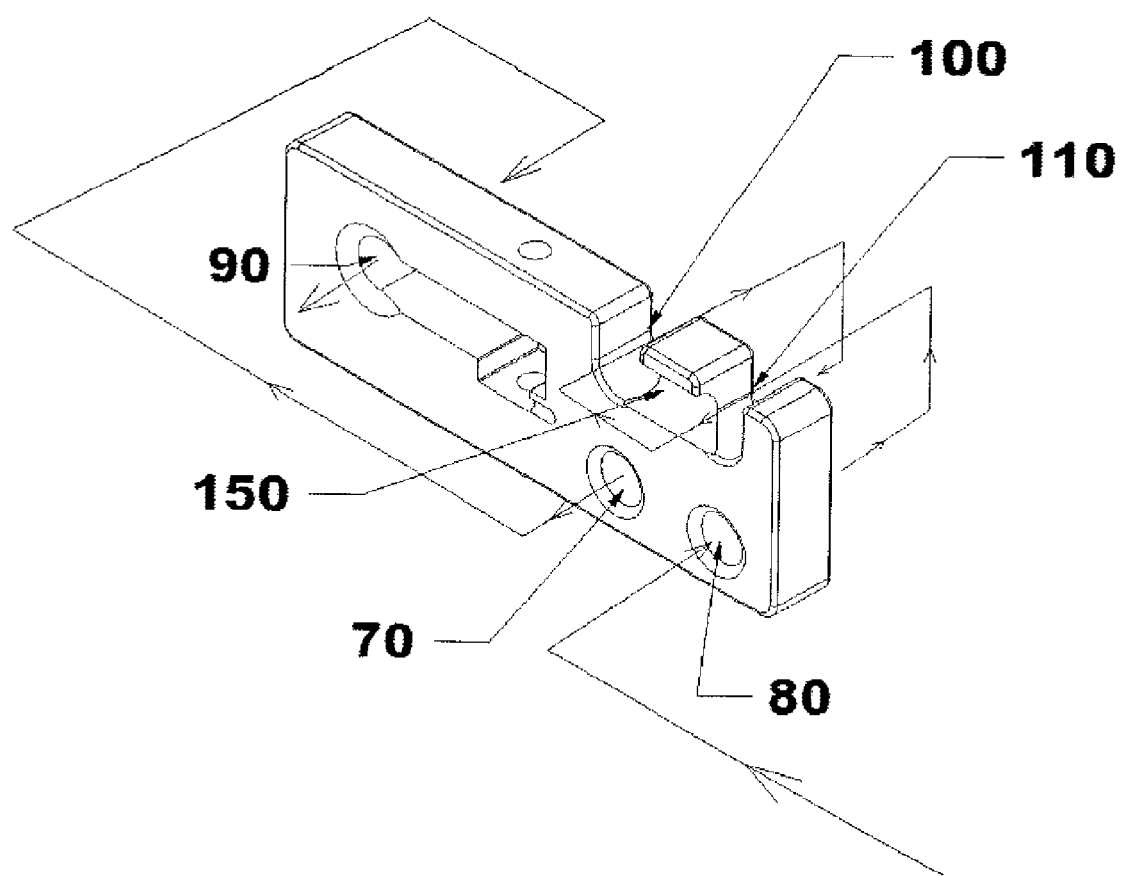
FIG. 6 is a perspective front view of the device according to the present invention showing the sequence in which the rope is introduced into the device.

FIG. 6 shows the sequence in which the rope is introduced into the device according to the present invention. First, a length of rope is drawn through the first bore 70 in either a first or an oppositely directed second direction. Second, the length of rope leaving the first bore 70 is looped back through the first slot 100 and over the space 150 between the first slot 100 and the second slot 110. Third, the end of the rope passes the second slot 110 and loops back through the second bore 80. Fourth, a loop of a desired length is formed and the remaining rope is routed through the space between the cam element 120 and the side wall 92 of the third bore 90.

The multiple bends in the rope through the bores 70, 80 and slots 100, 110 assist in providing additional locking of the rope in the desired position to prevent the slippage of rope in the load direction.

The unique design of the present invention has the advantage of providing a double locking feature for the rope: 1) the multiples bend on the rope through the bores and slots, and 2) the cam element. Both locking systems work together to prevent the slippage of the rope and allow placing the device at any position along the length of the rope when tensioning is desired.

When the cam element 120 is in the closed position it partially blocks the space between the clamp element 120 and side wall 92 of the third bore 90 and locks the rope. When the cam element is in the opened position it does not block the space between the clamp element 120 and side wall 92 of the third bore 90 and does not engage or contact the rope; thus, the rope may be freely pulled through the passageway in either the first or the second direction.

Thus, the device according to the present invention is used to shorten the effective length of the rope between the two ends of the rope until it is pulled tight. At this time, the cam element 120 is pressed downwardly by the spring 170 to cause the teeth 122 to firmly bite into the rope firmly holding it in place. Any attempt to move the pre-selected length of rope (loop) located between the second bore 80 and the cam element 120 further increases the clamping action of the device; so accidental loosening of the desired loop of rope does not occur. Changes in the size desired loop of rope cannot occur unless the cam element 120 is manually raised to disengage it from the rope.

In another preferable embodiment of the present invention the device may be used with a single rope having one fixed hook and 1 floating hook.

In another preferable embodiment, the device may be used with two ropes, one secure to the bore and slot arrangement and another rope with the cam locking device.

Figure 7:
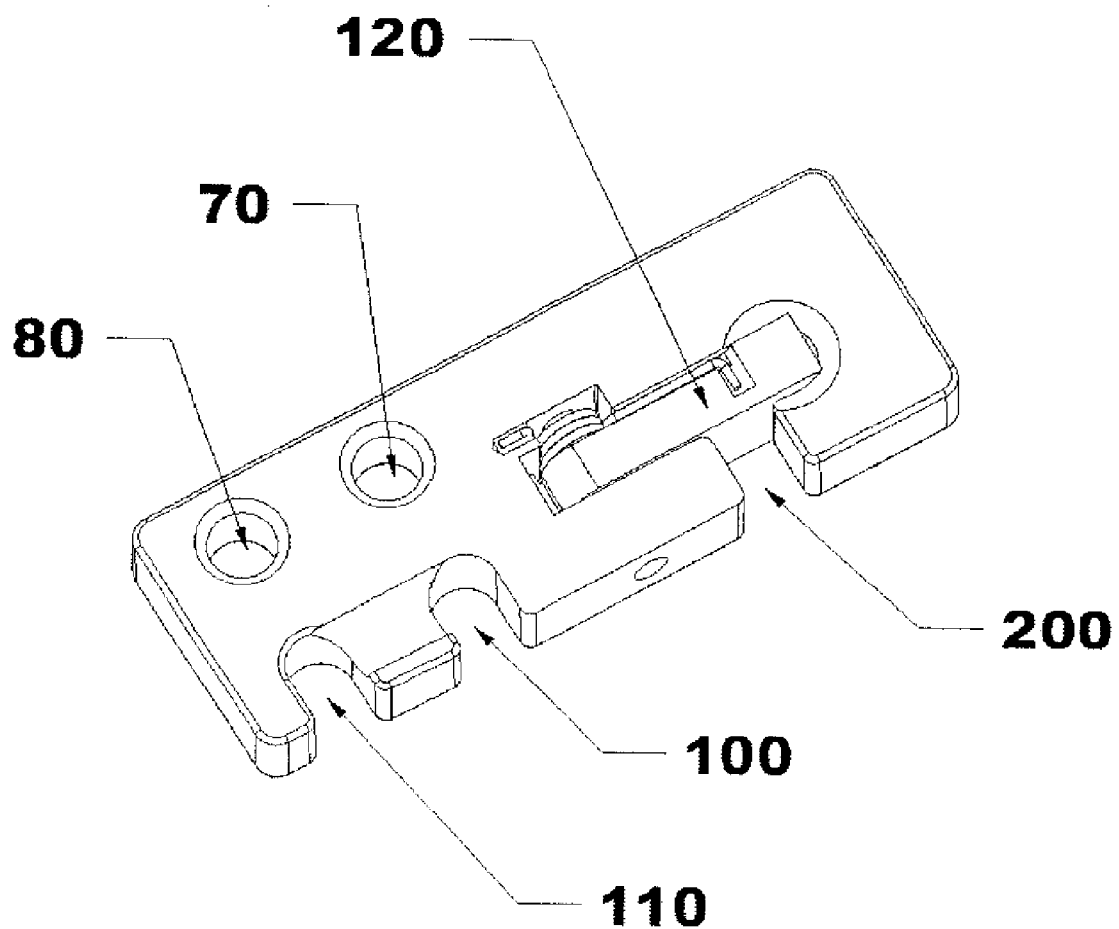
FIG. 7 is a perspective front view of the device according to a second embodiment of the present invention.
Figure 8:
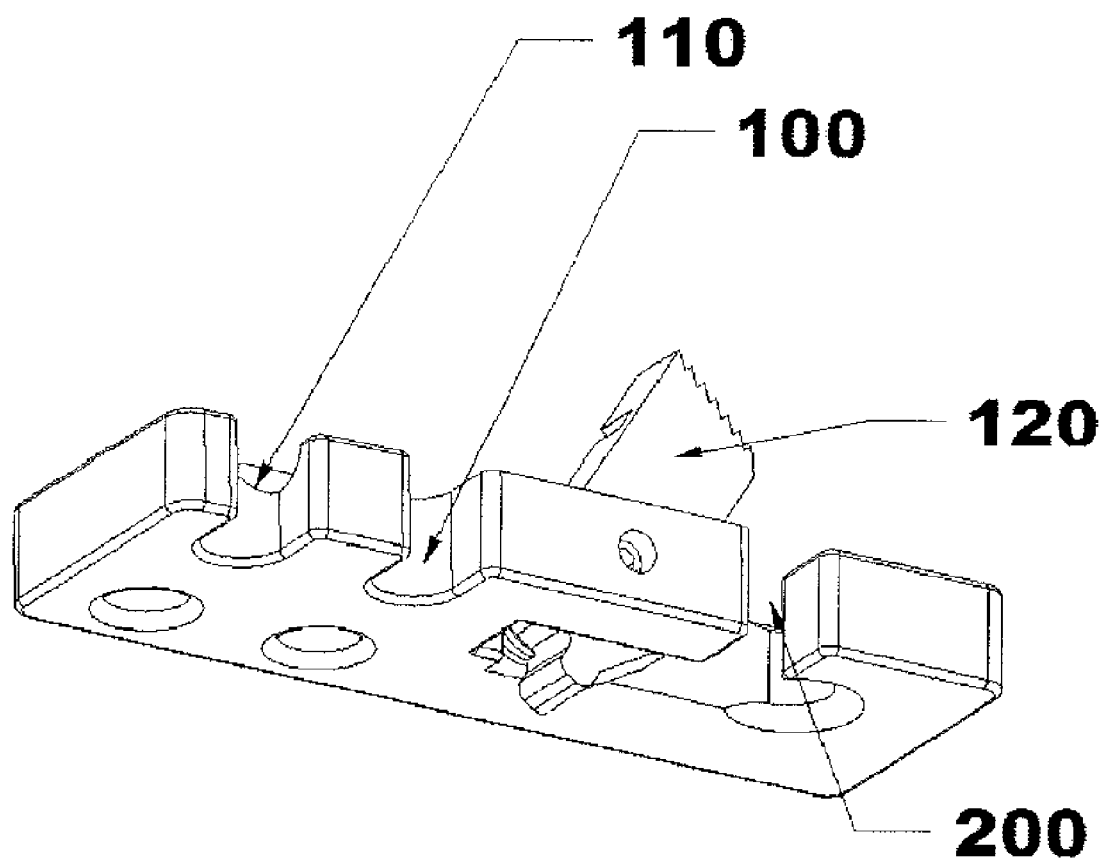
FIG. 8 is a side view of the device according to FIG. 7.
Figure 9:
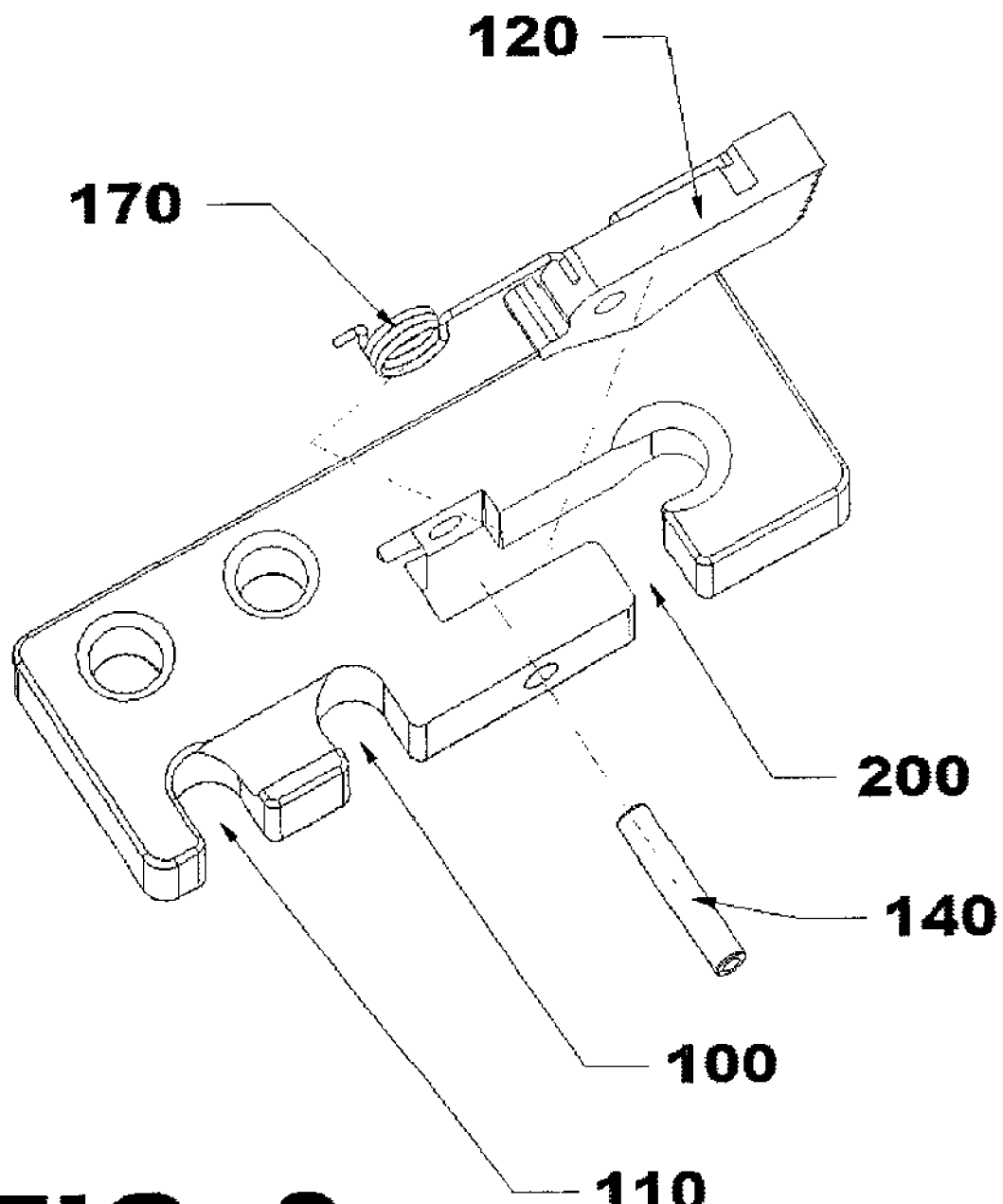
FIG. 9 is an exploded view of the device according to FIG. 7.

FIGS. 7-9 show another embodiment of the present invention in which the device is slipped over the rope, versus threading the rope through the device. The device includes an open area 200 in connection with the third bore hole 90. In this embodiment, the device is preferably made of, but not limited to, metal.

While the invention has been described in conjunction with specific embodiments, it is evident that many alternatives, modifications and variations will be apparent to those skilled in the art in light of the foregoing description. Accordingly, the present invention attempts to embrace all such alternatives, modifications and variations that fall within the spirit and scope of the appended claims.

What is claimed is:

1. A rope locking device comprising:
a body having a first end, a second end, and side ends;
a first bore extending through the body;
a second bore extending through the body, wherein the second bore is horizontally aligned and spaced apart from said first bore by a first space, wherein the first and second bore are located proximate to the first end of the body;
a third bore extending through the body, wherein the third bore is located proximate to the second end of the body, and wherein the third bore is spaced from said first and second bores;
a first slot vertically aligned with the first bore;
a second slot vertically aligned with the second bore, wherein the second slot is spaced from the first slot by a second space;

a cam element pivotally mounted within the third bore;
a channel running from one of the side walls of the body, through the third bore, and through the other side wall, wherein the channel is vertically aligned with the third bore and the cam element; and
a dowel that passes through the channel and pivotally supports the cam element inside the third bore.

2. The rope locking device according to claim 1, wherein the first and second bores are parallel to each other.

3. The rope locking device according to claim 1, wherein the third bore is not connected with the first bore or the second bore.

4. The rope locking device according to claim 1, wherein the third bore is not horizontally aligned with the first bore or the second bore.

5. The rope locking device according to claim 4, wherein the first and second bores are vertically spaced from the slot by a third space.

6. The rope locking device according to claim 5, wherein the third bore is horizontally aligned with the third space.

7. The rope locking device according to claim 1, further comprising an open area in connection with the third bore hole.

8. A rope locking device comprising:
a body having a first end, a second end, and side ends;
a first bore extending through the body;
a second bore extending through the body, wherein the second bore is horizontally aligned and spaced apart from said first bore by a first space, wherein the first and second bore are located proximate to the first end of the body;
a third bore extending through the body, wherein the third bore is located proximate to the second end of the body, and wherein the third bore is spaced from said first and second bores;
a first slot vertically aligned with the first bore;
a second slot vertically aligned with the second bore, wherein the second slot is spaced from the first slot by a second space; and
a cam element pivotally mounted within the third bore;
wherein the first bore and second bore are tapered.

9. A rope locking device comprising:
a body having a first end, a second end, and side ends;
a first bore extending through the body;
a second bore extending through the body, wherein the second bore is horizontally aligned and spaced apart from said first bore by a first space, wherein the first and second bore are located proximate to the first end of the body;
a third bore extending through the body, wherein the third bore is located proximate to the second end of the body, and wherein the third bore is spaced from said first and second bores;
a first slot vertically aligned with the first bore;
a second slot vertically aligned with the second bore, wherein the second slot is spaced from the first slot by a second space;
a cam element pivotally mounted within the third bore; and
a channel running from one of the side walls of the body, through the third bore, and through the other side wall.

10. The rope locking device according to claim 9, wherein the channel is vertically aligned with the third bore and the cam element.

11. A rope locking device comprising:
a body having a first end, a second end, and side ends;
a first bore extending through the body;
a second bore extending through the body, wherein the second bore is horizontally aligned and spaced apart from said first bore by a first space, wherein the first and second bore are located proximate to the first end of the body;
a third bore extending through the body, wherein the third bore is located proximate to the second end of the body, and wherein the third bore is spaced from said first and second bores;
a first slot vertically aligned with the first bore;
a second slot vertically aligned with the second bore, wherein the second slot is spaced from the first slot by a second space; and
a cam element pivotally mounted within the third bore;
wherein the first and second slots have a U-shape and the second space has an L-shape.

12. A rope locking device comprising:
a body having a first end, a second end, and side ends;
a first bore extending through the body;
a second bore extending through the body, wherein the second bore is horizontally aligned and spaced apart from said first bore by a first space, wherein the first and second bore are located proximate to the first end of the body;
a third bore extending through the body, wherein the third bore is located proximate to the second end of the body, and wherein the third bore is spaced from said first and second bores;
a first slot vertically aligned with the first bore;
a second slot vertically aligned with the second bore, wherein the second slot is spaced from the first slot by a second space; and
a cam element pivotally mounted within the third bore;
wherein the cam element is spring biased.

* * * * *